United States Patent
Smaus et al.

(10) Patent No.: US 11,868,818 B2
(45) Date of Patent: Jan. 9, 2024

(54) LOCK ADDRESS CONTENTION PREDICTOR

(71) Applicant: Advanced Micro Devices, Inc., Sunnyvale, CA (US)

(72) Inventors: Gregory W. Smaus, Austin, TX (US); John M. King, Austin, TX (US); Matthew A. Rafacz, Austin, TX (US); Matthew M. Crum, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/273,304

(22) Filed: Sep. 22, 2016

(65) Prior Publication Data

US 2018/0081544 A1    Mar. 22, 2018

(51) Int. Cl.
*G06F 9/52* (2006.01)
*G06F 9/50* (2006.01)

(52) U.S. Cl.
CPC . *G06F 9/52* (2013.01); *G06F 9/50* (2013.01)

(58) Field of Classification Search
CPC ........ G06F 12/0246; G06F 12/00; G06F 9/52; G06F 9/50
USPC .................................. 711/103, 150
See application file for complete search history.

(56) References Cited

U.S. PATENT DOCUMENTS

| | | | | |
|---|---|---|---|---|
| 6,487,652 | B1 * | 11/2002 | Gomes | G06F 9/52 712/23 |
| 2003/0079094 | A1 | 4/2003 | Rajwar et al. | |
| 2004/0162948 | A1 * | 8/2004 | Tremblay | G06F 9/30116 711/137 |
| 2006/0004998 | A1 * | 1/2006 | Saha | G06F 9/30087 712/E9.05 |
| 2006/0053351 | A1 * | 3/2006 | Anderson | G06F 9/3004 714/100 |
| 2006/0161740 | A1 | 7/2006 | Kottapalli et al. | |
| 2009/0125519 | A1 * | 5/2009 | Robison | G06F 9/467 |
| 2010/0169623 | A1 | 7/2010 | Dice | |
| 2010/0332770 | A1 * | 12/2010 | Dice | G06F 9/526 711/E12.066 |
| 2011/0113406 | A1 | 5/2011 | Flemming et al. | |
| 2013/0097607 | A1 | 4/2013 | Lewis et al. | |

(Continued)

FOREIGN PATENT DOCUMENTS

CN    1973261 A    5/2007
CN   101847091 A    9/2010

(Continued)

*Primary Examiner* — Gautam Sain
(74) *Attorney, Agent, or Firm* — Volpe Koenig

(57) ABSTRACT

Techniques for selectively executing a lock instruction speculatively or non-speculatively based on lock address prediction and/or temporal lock prediction. including methods an devices for locking an entry in a memory device. In some techniques, a lock instruction executed by a thread for a particular memory entry of a memory device is detected. Whether contention occurred for the particular memory entry during an earlier speculative lock is detected on a condition that the lock instruction comprises a speculative lock instruction. The lock is executed non-speculatively if contention occurred for the particular memory entry during an earlier speculative lock. The lock is executed speculatively if contention did not occur for the particular memory entry during an earlier speculative lock.

34 Claims, 8 Drawing Sheets

(56) References Cited

U.S. PATENT DOCUMENTS

| | | | |
|---|---|---|---|
| 2014/0059333 A1* | 2/2014 | Dixon | G06F 13/1673 |
| | | | 712/244 |
| 2015/0032998 A1* | 1/2015 | Rajwar | G06F 9/30145 |
| | | | 712/208 |
| 2015/0242246 A1 | 8/2015 | Gschwind et al. | |
| 2015/0277967 A1 | 10/2015 | Calciu et al. | |
| 2015/0363243 A1* | 12/2015 | Gschwind | G06F 9/522 |
| | | | 710/200 |
| 2016/0098299 A1* | 4/2016 | Balakrishnan | G06F 9/5016 |
| | | | 718/104 |

FOREIGN PATENT DOCUMENTS

| | | |
|---|---|---|
| JP | 2008504603 A | 2/2008 |
| JP | 2008525923 A | 7/2008 |
| JP | 2011-175669 | 9/2011 |
| KR | 10-2016-0026599 | 3/2016 |
| WO | 2006012103 A2 | 2/2006 |
| WO | 2016139446 A1 | 2/2008 |
| WO | 2015055083 A1 | 4/2015 |

\* cited by examiner

LOCK ADDRESS CONTENTION PREDICTOR

BACKGROUND

Shared memory computing architectures allow multiple threads to access the same memory, such as a cache memory or other level of a memory hierarchy. For example, a single processor or processor core can execute a plurality of threads or processes, each thread or process having access to a shared memory, such as a cache, which is shared by the threads and/or processes. Similarly, multiple processors or cores of a multi-core processor can execute a plurality of threads or processes, each thread and/or process having access to a memory, such as a cache, which is shared by the processors or cores, and by the threads and/or processes.

BRIEF DESCRIPTION OF THE DRAWINGS

A more detailed understanding can be had from the following description, given by way of example in conjunction with the accompanying drawings wherein.

DETAILED DESCRIPTION

Some embodiments provide a method for locking an entry in a memory device. A lock instruction executed by a thread for a particular memory entry of a memory device is detected. Whether contention occurred for the particular memory entry during an earlier speculative lock is detected on a condition that the lock instruction includes a speculative lock instruction. The lock is executed non-speculatively if contention occurred for the particular memory entry during an earlier speculative lock. The lock is executed speculatively if contention did not occur for the particular memory entry during an earlier speculative lock.

Some embodiments provide a method for locking an entry in a memory device. A lock instruction executed by a thread for a particular memory entry of a memory device is detected. Whether, during a particular time period, a number of earlier speculative locks of the memory for which contention occurred exceeds a threshold number, is detected on a condition that the lock instruction includes a speculative lock instruction. The lock is executed non-speculatively if the number exceeds the threshold number. The lock is executed speculatively if the number does not exceed the threshold number.

Some embodiments provide a processing device configured for speculative locking. The device includes a processor core having an execution pipeline; lock instruction detection circuitry configured to detect a lock instruction executed by a thread for a particular memory entry of a memory device; contention detection circuitry configured to detect, on a condition that the lock instruction comprises a speculative lock instruction, whether contention occurred for the particular memory entry during an earlier speculative lock; locking circuitry configured to execute the lock non-speculatively, if contention occurred for the particular memory entry during an earlier speculative lock; the locking circuitry further configured to execute the lock speculatively, if contention did not occur for the particular memory entry during an earlier speculative lock.

Some embodiments provide a processing device configured for speculative locking. The device includes a processor core having an execution pipeline; lock instruction detection circuitry configured to detect a lock instruction executed by a thread for a particular memory entry of a memory device; contention detection circuitry configured to detect, on a condition that the lock instruction includes a speculative lock instruction, whether, during a particular time period, a number of earlier speculative locks of the memory for which contention occurred exceeds a threshold number; locking circuitry configured, if the number exceeds the threshold number, to execute the lock non-speculatively; and the locking circuitry further configured, if the number does not exceed the threshold number, to execute the lock speculatively.

Figure 1:
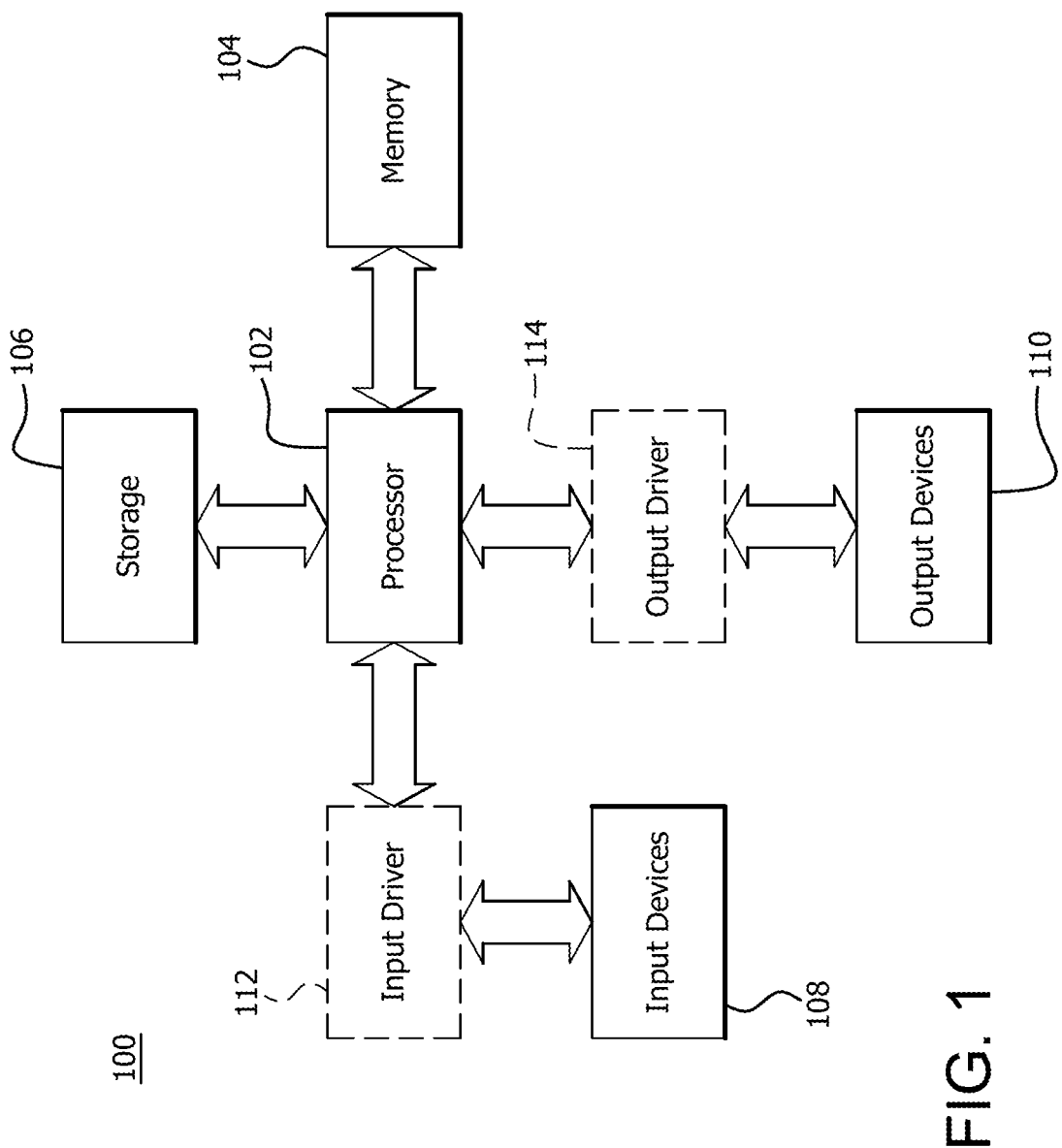
FIG. 1 is a block diagram of an example device in which one or more disclosed embodiments can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
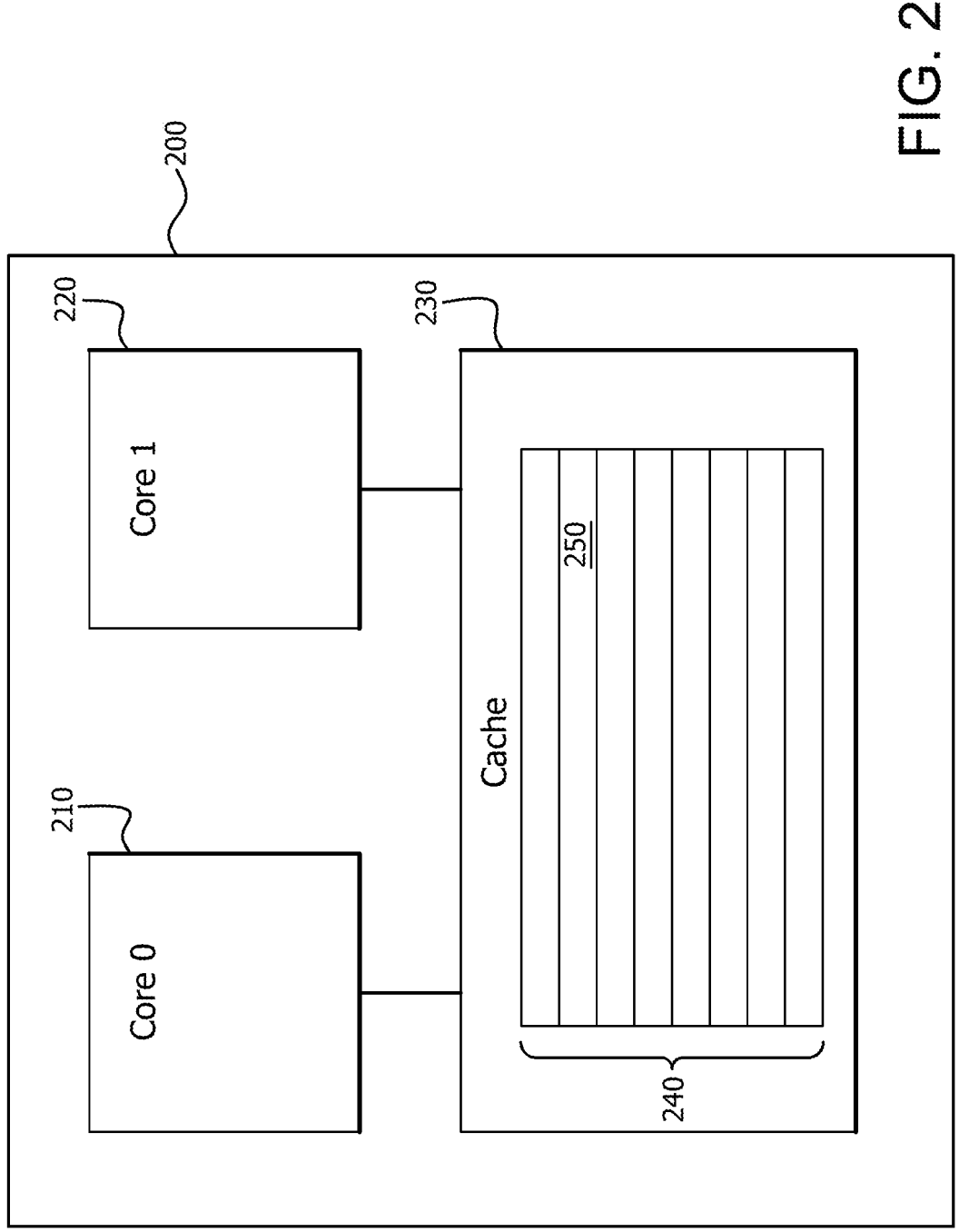
FIG. 2 is a block diagram which illustrates an example multi-core processor usable with the device of FIG. 1 and with which one or more disclosed embodiments can be implemented.

FIG. 2 is a schematic which illustrates an example multi-core processor 200 including two processing cores 210 and 220. Processor 200 can be used with device 100, for example, as processor 102. Cores 210 and 220 can be any suitable computing cores, such as CPU cores, GPU cores, or one each of a CPU core and a GPU core. Cores 210 and 220 share access to cache memory 230. Cores 210 and 220 can each execute threads which can access at least some of the same cache entries 240 in cache 230. In some implementations, either or both of cores 210 and 220 can each execute a plurality of threads having access to at least some of the same cache entries 240 in cache memory 230. While the examples discussed herein relate to cache memory, the principles described herein are applicable to any suitable memory or portion of a memory hierarchy, such as another cache layer (not shown) or memory 104 as shown and described with respect to FIG. 1. Processor 200 is exemplary, and the principles described herein are also applicable to single core processors or processors having more than two cores.

One problem which can arise in shared memory architectures relates to atomic access. For example, if a first thread is operating on (e.g., reading from and writing to) data in a particular memory location (e.g., cache entry 250 in FIG. 2) within a shared memory, the data can be corrupted if a second thread operates on the same memory location at the same time.

This problem can be addressed using a lock. A lock is a mutual exclusion (mutex) mechanism which allows only one thread to access a particular memory location until the lock is released. The thread having acquired the lock is typically guaranteed atomic access to the locked memory location until it releases the lock.

A thread can acquire a lock on a particular memory location, for example, by executing a lock instruction before executing other instructions which impact data stored at the memory location, such as a store instruction. For exemplary purposes herein, a lock is obtained by a lock instruction executed by a thread, and the lock is also released by an instruction executed by the thread. In some implementations however, a lock can be obtained and/or released by a prefix to an instruction executed by a thread, a particular type or version of an instruction, or in any other suitable manner. Any of these can be referred to as a lock instruction, regardless of whether they include a discrete lock instruction or whether the lock instruction is combined with another instruction or operation as a flag, bit, or prefix, for example. In general, if a particular memory location is locked by a thread or process, a different thread or process attempting to access the memory location will not be permitted to access the memory location and typically will receive a negative acknowledgement (NAK) signal or other suitable signal. The various techniques and devices discussed herein are not however limited to any particular implementation of a lock.

Locks can be costly in terms of processing time, which can delay the thread or process which holds the lock. A lock instruction that guarantees its atomic property by locking a memory location in the processor cache requires the lock instruction to wait for all older instructions in its thread to complete before locking the line in the cache. While the lock instruction waits for the older instructions to complete, buffers in the processor can back-up (i.e., become or approach full), stalling the processor.

One way of mitigating or avoiding these possible disadvantages is to relax one or more properties of the lock, such as atomicity or fencing. For example, a lock can be relaxed by not enforcing or not strictly enforcing atomic access. In such cases, a second thread would be permitted to access a memory location locked by a first thread. In order for relaxed atomic access to function however, it must be established either that a second thread did not access the memory location while the lock was held by the first thread, or that the access by the second thread did not have an adverse effect on the execution of the first thread during the lock (e.g., a calculation made by the second thread under the relaxed lock produces the same result as it would have under a strict lock). Because it is not necessarily known in advance whether relaxing the lock properties will yield valid data in the locked memory location, the thread holding a relaxed lock can be referred to as executing speculatively, or under a speculative lock.

In a simple example of a speculative lock with relaxed atomicity, a second thread is permitted read access only to the locked memory location, which does not alter the data. In this case, the lock is relaxed with respect to reads, permitting the second thread to execute such reads instead of waiting for the first thread to release the lock.

In a more complex example of a speculative lock with relaxed atomicity, the second thread is permitted to write to, or otherwise modify, the locked memory location. This would not have an adverse impact on the execution of the first thread, for example, in cases where a second thread does not in fact access the locked memory location while the lock is held by the first thread. However, a speculative lock of this type can have an adverse impact on the execution of the first thread in cases where the first thread reads from the locked memory before it has been modified by the second thread and the first thread writes to the locked memory after it has been modified by the second thread.

In another example, a lock can be relaxed by not strictly enforcing fencing properties. In such cases, a first thread would be allowed to execute out of order while holding the lock for a particular memory location. This can lead to a violation of fencing properties under some circumstances. For example, if a read instruction from the first thread, "younger" (i.e., later) than the lock instruction, executes before the speculative lock has completed, it can read stale data. This can occur where a write instruction from a second thread writes to the read instruction's memory location before the speculative lock completes. Because the validity of the data in the locked location can be jeopardized by relaxed lock properties, the validity of the read instruction's data must be tested.

One possible test to determine whether the data is valid is to determine whether a second thread did or did not access the locked location while the speculative lock was held by the first thread. Reads by other threads do not violate the locking properties. However, there is a window of exposure of the speculative lock to writes by other threads. The window starts when the speculative lock reads its memory location, and ends when the speculative lock completes. While the thread is in the speculative lock's window of exposure, the thread must watch for writes by other threads that will cause violations of the locking properties of the speculative lock. The speculatively locked memory location, and all reads younger than the speculative lock which have completed before the speculatively locked memory location is written, can be tested or monitored. If no other thread has written to the locked location, the data can be presumed valid.

If the data stored in the locked location is found to be valid, execution can continue as normal, and the time penalties associated with strict locking can be avoided. If the data stored in the locked location is found to be (or presumed to be) invalid however, the execution pipeline (e.g., of the core and/or processor executing the thread) must be flushed, and the thread which held the speculative lock must be re-executed in a manner that produces valid results. Thus in an example where data stored in a locked location within a processor cache (or after the lock is released) is found to be invalid due to violation of the locking properties of the speculative lock, the execution pipeline is flushed, and the first thread is re-executed using strict locking (i.e., using a non-speculative lock) in order to avoid the relaxed conditions which resulted in the invalid data. After re-executing the thread under a non-speculative lock, the data in the locked location can be presumed not to have been overwritten by another thread.

Figure 3:
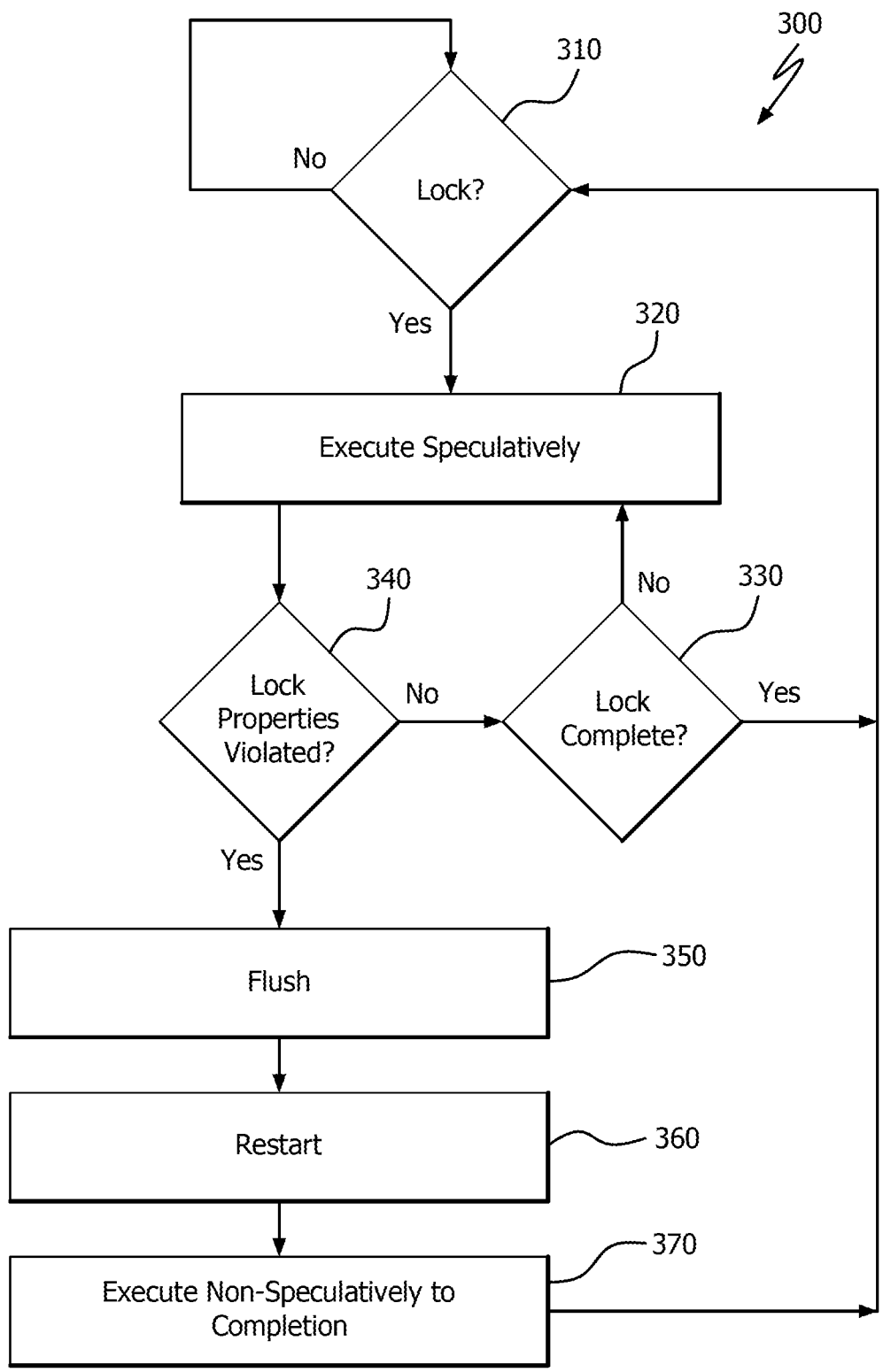
FIG. 3 is a flow chart illustrating an example method for executing speculative locks.

FIG. 3 is a flow chart illustrating an example method 300 for executing speculative locks. On a condition 310 that a first thread executes a lock instruction, the thread executes with a speculative lock on a particular memory location in step 320. During speculative execution in step 320 the data in the memory location is tested for validity as discussed above. On a condition 340 that the locking properties have not been violated, the lock continues to execute speculatively unless on condition 330 the speculative lock has completed. If the locking properties are found to have been violated on condition 340, the execution pipeline is flushed in step 350, the thread restarts in step 360, and the lock executes non-speculatively to completion in step 370.

Flushing the execution pipeline and re-executing the thread have an associated time penalty however, which can offset time gains realized by relaxing the lock properties. Thus, relaxing the properties of the lock can have diminishing returns in certain situations. In other words, under certain circumstances, flushing the execution pipeline and re-executing the thread due to a failed speculative lock can be more costly in terms of time (and circuit area) then simply executing a non-speculative lock in the first place. Accordingly, it may be desired to predict situations where relaxed lock properties are likely to result in flushing the memory and restarting execution in order to avoid the associated time penalties.

One approach to predicting situations where relaxed lock properties are likely to result in invalid data is to track lock address contention. Such prediction is based on the idea that a speculative lock on a particular address is likely to result (or has a certain probability of resulting) in a flush and restart if a speculative lock on that address has resulted in a flush and restart in the past, or if other threads have attempted to access the address (i.e., contended for the address) while it was locked in the past. Such prediction can be referred to as lock address contention prediction. For example, if a speculative lock on a particular memory address results in a flush and restart, this occurrence can be tracked. Future locks on that memory address can be forced to run non-speculatively as a result. Variations on this strategy are possible.

In one example, a locked address contention predictor (LACP) tracks processor cache lines which were accessed by speculative locks that caused a flush and restart.

Figure 4:
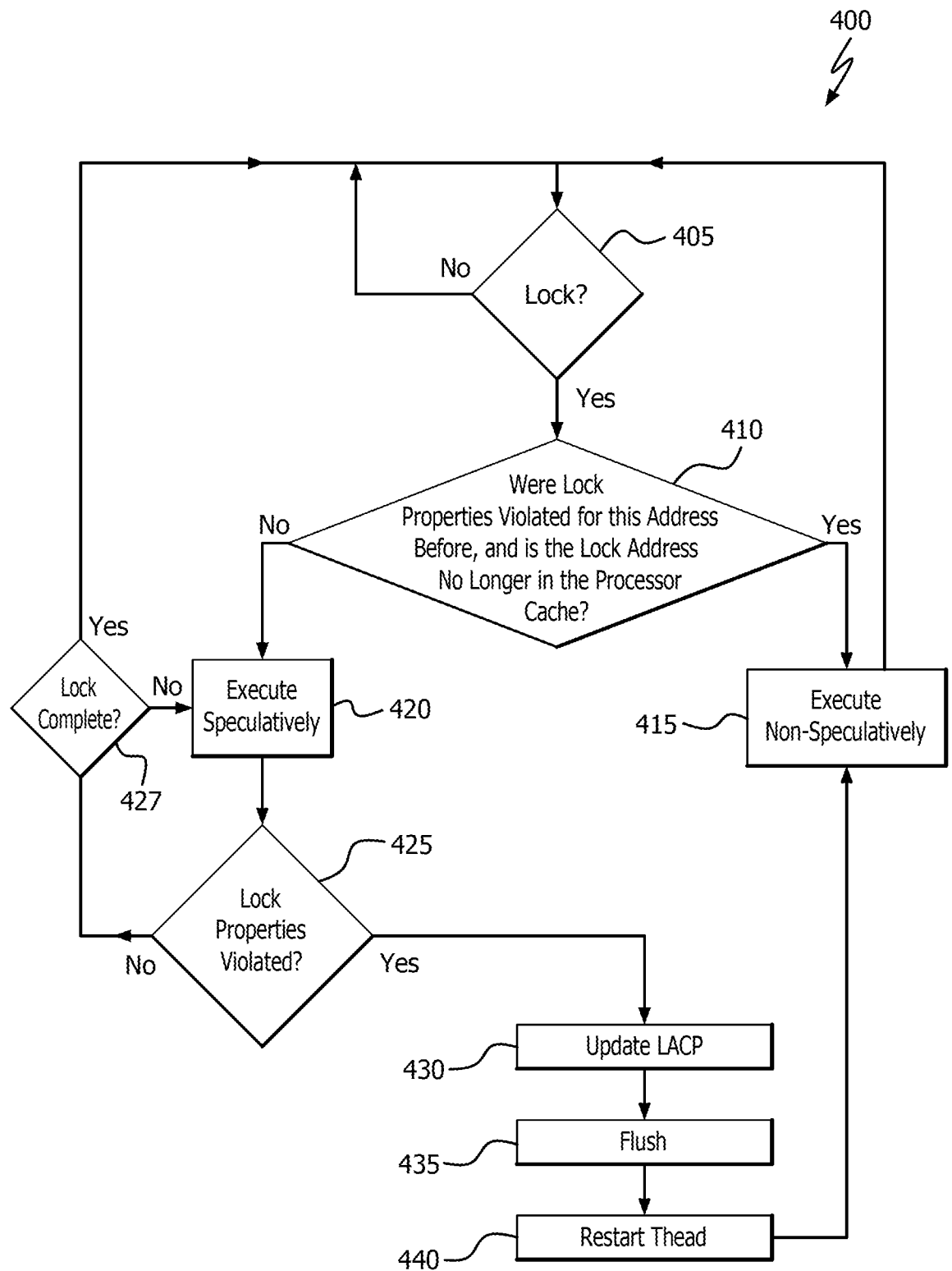
FIG. 4 is a flow chart illustrating an example method for executing speculative locks using lock address contention prediction.

FIG. 4 is a flow chart illustrating an example method 400 for executing speculative locks using lock address contention prediction. On a condition 405 that a first thread executes a lock instruction, LACP circuitry tests whether lock properties were violated at the target address following a speculative lock in the past, and whether the locked address is no longer in the processor's local cache. On a condition 410 that lock properties were violated in the past and the locked address is no longer in the processor's local cache, the lock executes non-speculatively in step 415. Otherwise, the lock executes speculatively in step 420.

During speculative execution in step 420, the LACP circuitry tests whether lock properties were violated for the locked address. In some implementations, the locking properties are presumed to have been violated if another thread has accessed the memory location during speculative execution. On a condition 425 that the lock properties have not been violated, the lock continues to execute speculatively unless on condition 427 the speculative lock has completed.

On a condition 425 that the lock properties were violated, the LACP is updated in step 430. Updating the LACP entails either adding the locked address to the LACP or, if the locked address is already recorded in the LACP, updating the LACP entry age (the LACP in this implementation includes circuitry for tracking the "age" or length of time that the locked address has been recorded in the LACP) and clearing its hit bit. In either case, a hit bit (or other indicator) associated with the LACP entry is cleared (or otherwise configured) to prevent speculative execution of locks on that address. The execution pipeline is flushed in step 435, and the thread is restarted and executes non-speculatively in steps 440 and 415.

It is noted that if desired, the prohibition on speculatively locking a particular address may expire. In some implementations, the expiration can occur explicitly after a desired duration, a number of instructions, a number of locks, or otherwise. In some implementations, the expiration can occur due to the address being evicted from the LACP to make room for another address.

Figure 5:
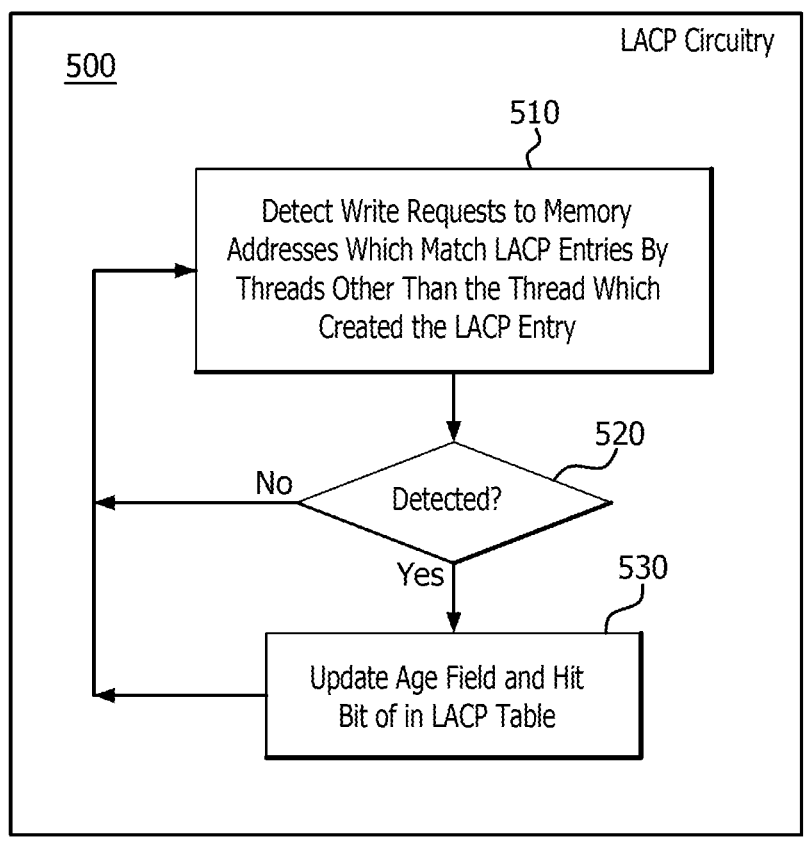
FIG. 5 is a block diagram illustrating the functionality of example lock address contention prediction write request monitoring circuitry.

FIG. 5 is a block diagram illustrating the functionality of example LACP write request monitoring circuitry 500. In some implementations, circuitry 500 is usable with the method 400 as shown and described with respect to FIG. 4 and/or other implementations discussed herein, and may be incorporated into or otherwise used with LACP device 600 as shown and described with respect to FIG. 6.

Circuitry 500 is configured to monitor write requests to LACP entries. In step 510, circuitry 500 detects whether, for any LACP entries, another thread is attempting to write to addresses stored in the LACP entries. On a condition 520 that such a write attempt is detected, circuitry 500 updates the age field and hit bit (or other indicator) of a corresponding LACP entry in step 530. Otherwise, circuitry 500 continues to monitor write requests by other threads in step 510.

It is noted that the steps illustrated in FIG. 5, where incorporated with other implementations discussed herein (such as FIG. 4) execute asynchronously with those mechanisms. Thus, in this example LACP write request monitoring circuitry 500 does not wait for speculative or non-speculative locks to complete before updating the age field and hit bit of the LACP entries, and does not wait for speculative or non-speculative locks to begin before testing for write requests to processor cache entries. It is noted that in other implementations, the steps illustrated in FIG. 5 can be executed synchronously.

In this example implementation, the LACP entry's address is tracked while the cache line associated with that address is in the processor's local cache. It is noted that in other implementations, the LACP entry's address may be tracked at all times. In such implementations, the LACP indicates that the line has not detected contention. In the present example implementation, the hit bit indicates whether or not the LACP tracked address is still cached in the processor's local cache.

Figure 6:
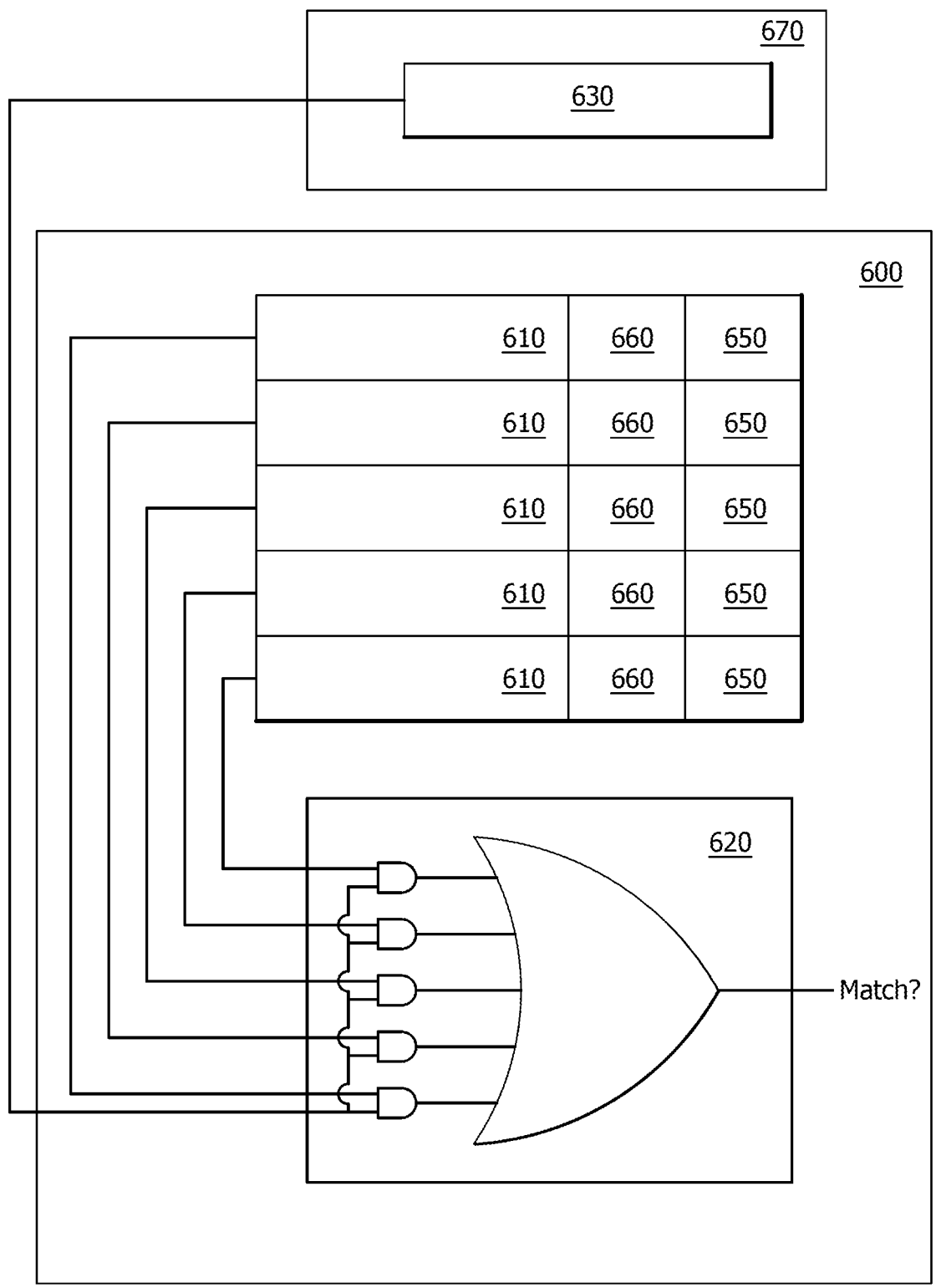
FIG. 6 is a block diagram illustrating an example lock address contention prediction mechanism.

FIG. 6 is a block diagram illustrating an example LACP mechanism 600 according to various implementations discussed herein. Example LACP mechanism 600 includes several memory entries 610, however it is noted that any suitable number of entries can be used. These memory entries 610 are configured to store the addresses of memory locations in a processor cache 670 where locking properties were violated while speculatively locked in the past. In some implementations, memory entries 610 can also or instead be configured to store the addresses of memory locations in the processor cache 670 for which other threads have contended for access during a lock.

The number of LACP memory entries can be based on a desired replacement strategy (e.g., based on trade-offs between the amount of logic circuitry required to implement the entries vs. replacing an entry that may otherwise have provided useful information in the future). In this example, the LACP memory entries 610 are entries within a cache of the LACP. Each of entries 610 can be used to track a cache line of processor cache 670 for which the lock properties of a speculative lock were violated. Each of entries 610 includes a hit bit 650, and an age field 660.

If, during execution of a thread, a lock instruction is executed for a cache entry 630 of processor cache 670, and if the address of cache entry 630 does not match an address stored in one of LACP entries 610, the lock can execute speculatively. If the address of cache entry 630 does match an address stored in one of LACP entries 610, it can execute speculatively if the cache hit bit 650 for the particular LACP entry 610 is asserted. If the cache hit bit 650 for the particular LACP entry 610 is not asserted however, the lock must execute non-speculatively. It is noted that the assertion/non-assertion can be expressed in any suitable way, such as using a bit, flag, or field.

The hit bit 650 is cleared when a new LACP entry 610 is created due to a speculative lock's properties being violated, where the speculatively locked processor cache address is not already stored in the LACP. The hit bit 650 of an existing LACP entry 610 is cleared when a write access from another thread (i.e., other than the thread that created the LACP entry) matches an LACP entry 610. The hit bit is asserted when a non-speculative lock completes for the thread that created the LACP entry (a non-speculative lock completing guarantees the cache line is in the local cache).

If a lock is executed speculatively for cache entry 630 of processor cache 670 for example, and if the lock properties of the speculative lock on cache entry 630 are violated (e.g., by a write access from a thread other than the thread which holds the speculative lock), the address of cache entry 630 is compared with each of the entries 610 using comparator 620.

If cache entry 630 does not match an existing one of LACP entries 610, one of the LACP entries 610 is selected to track the speculative lock's cache line 630, and the address of cache entry 630 is stored in one of the LACP entries 610 according to any desired replacement strategy. LACP entries can be evicted and replaced using any suitable cache replacement algorithm (e.g., based on trade-offs between the amount of logic circuitry required and/or delay incurred vs. replacing an entry that may provide useful information in the future). For example, an empty LACP entry can be used, or the least recently used LACP entry (e.g., as determined according to age field 660) can be replaced if there is no empty LACP entry.

The hit bit 650 of the LACP entry 610 is also cleared, if the locking properties of the speculative lock are violated, to indicate that locks should be prevented from executing speculatively for this address, and the age field 660 of LACP entry 610 is reset. After LACP entry 610 has been created, the thread is restarted, and the lock executes non-speculatively.

If write access of another thread to processor cache entry 630 does match an existing one of LACP entries 610, the hit bit 650 is cleared, indicating that locks should be prevented from executing speculatively for this address, and the age field 660 of the LACP entry 610 is reset.

If a non-speculative lock is asserted on the processor cache entry 630, the address of entry 630 is compared with LACP entries 610 using comparator 620. If processor cache entry 630 does match an existing LACP entry 610, the entry's hit bit is asserted upon or after completion of the lock, indicating that the LACP entry's address is associated with a memory location currently resident in the processor's local cache. The asserted hit bit indicates that a subsequent lock instruction that matches the LACP entry can be executed speculatively. If another thread probes entry 630 for memory access prior to the later lock instruction being executed however, the address of entry 630 is compared with entries 610 using comparator 620. If cache entry 630 does match an existing LACP entry 610, the entry's hit bit is cleared to indicate that locks may not be executed speculatively for cache entry 630.

As can be seen from the foregoing, the LACP cache hit bit 650 can distinguish two cases of operation. In a first case, an LACP entry 610 is recorded for a non-speculative lock on processor local cache 670. In this case, the LACP cache hit bit 650 is asserted to indicate that locks may continue to be executed speculatively for cache entry 630. Speculative locks are allowed in this case even though the address of cache entry 630 hit the LACP entry 610. In a second case, access by another thread removes cache entry 630 from the processor local cache 670. Accordingly, the hit bit for LACP entry 610 is cleared in this case to prevent lock instructions from running speculatively for cache entry 630. This addresses the chance that the second thread violates the locking properties on cache entry 630.

Another approach to predicting situations where relaxed lock properties are likely to result in flushing the execution pipeline and restarting execution using non-speculative locking is to track temporal lock contention. Such prediction is based on the idea that a speculative lock on any address is likely to result in a flush and restart if a given number of speculative locks on any address have resulted in a flush and restart in the past, or if a given number of other threads have contended for access to any address while it was locked in the past. A speculative lock on any address can also be considered likely if a given number of flush and restart or contention events have taken place with respect to any address within a given period of time, at a certain rate, or otherwise based on time. Such prediction can be referred to as temporal lock contention prediction.

In one example, a temporal lock contention predictor tracks the contention history of the last X cacheable lock instructions, where X can be any suitable number. X can be chosen, for example, based on trade-offs between the amount of logic required vs. replacing an entry that may provide useful information in the future. If a cacheable lock is speculative and causes a flush and restart, it is recorded by the temporal lock contention predictor as a lock contention event. If the number of lock contention events exceeds a desired threshold number Y, then subsequent lock instructions are prevented from executing speculatively. In this example, frequent failure of speculative locking is considered a predictor of future failure of the speculative locking.

Figure 7:
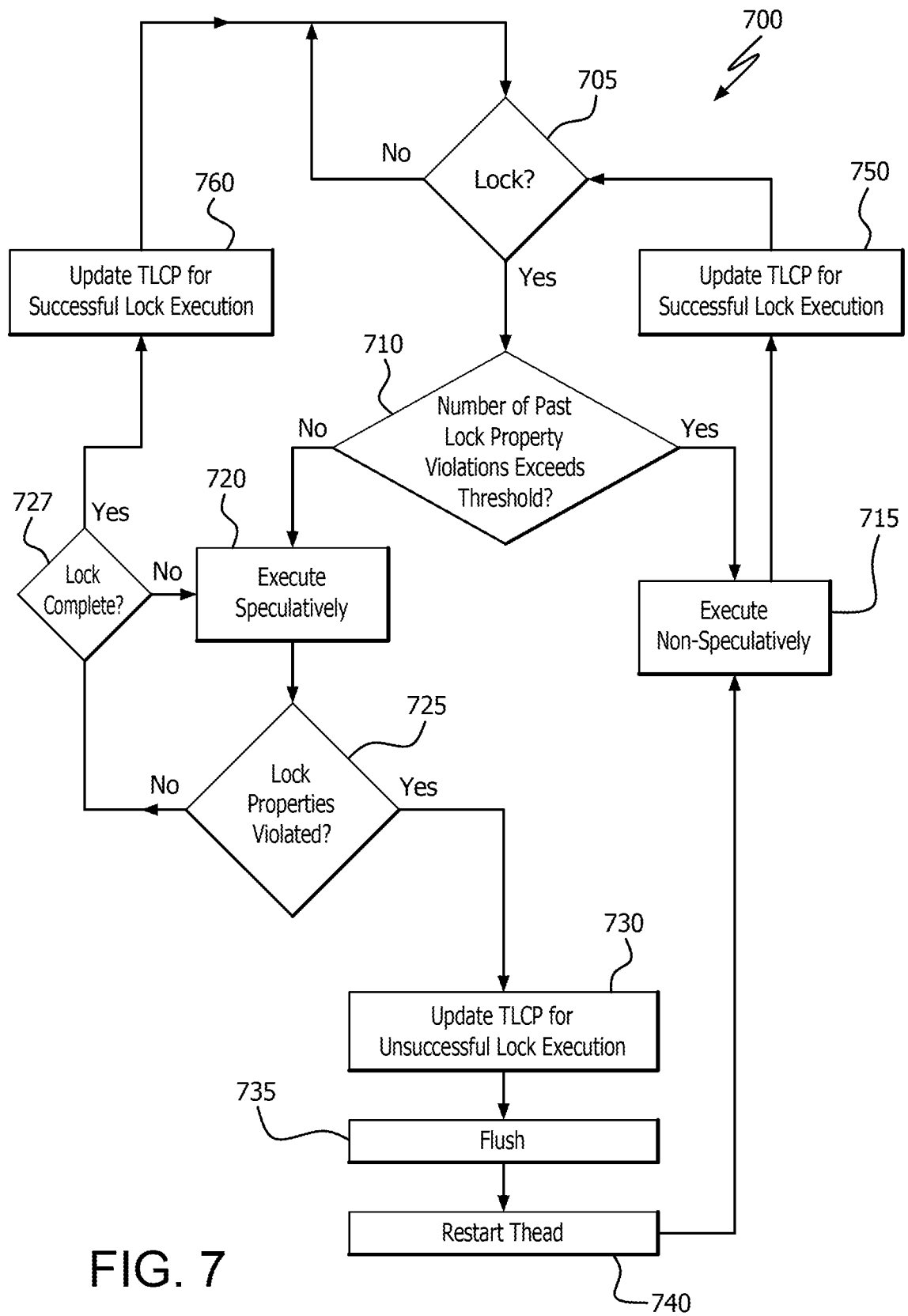
FIG. 7 is a flow chart illustrating an example method for executing speculative locks using temporal lock contention prediction.

FIG. 7 is a flow chart illustrating an example method 700 for executing speculative locks using temporal lock contention prediction (TLCP). On a condition 705 that a first thread executes a lock instruction, TLCP circuitry tests whether the lock properties have been violated during a speculative lock Y or more times in the past X cacheable lock instructions. In this example, the TLCP circuitry includes a counter for tracking the number of lock property violations that have occurred in the past X cacheable lock instructions, however the TLCP circuitry is not limited to this implementation. For example, the TLCP circuitry could instead track the absolute number of past cacheable lock instructions (not just within the past X cacheable lock instructions). It is noted that in various implementations, the TLCP may track the number of locking violations for a particular locked address, or all locking violations for any address.

On a condition 710 that lock properties have been violated Y or more times in the past X cacheable lock instructions, the lock executes non-speculatively in step 715, and the TLCP is updated for successful lock execution in step 750. If the lock properties have not been violated Y or more times in the past X cacheable lock instructions, the lock executes speculatively in step 720. During the speculative execution, the TLCP circuitry tests whether the lock properties of the speculative lock have been violated.

On a condition 725 that the lock properties of the speculative lock have not been violated, and on a condition 727 that the lock is complete, the TLCP is updated for successful lock execution in step 760. On a condition 725 that the lock properties are found to have been violated, the data in the TLCP is updated for an unsuccessful lock execution in step 730, the execution pipeline is flushed in step 735, the thread is restarted in step 740, executes non-speculatively in step 715, and the TLCP is updated for successful lock execution in step 750.

In another example, TLCP circuitry also tracks the contention history of the last X cacheable lock instructions. In this example, if the cacheable lock is a speculative lock whose lock properties have been violated, the locked address is recorded by the TLCP circuitry. If the number of lock contention events exceeds a desired number Y, then subsequent lock instructions are prevented from executing speculatively. This implementation is exemplary. For example, the TLCP circuitry could instead track the number of flush/restarts and NAKs within a certain time window, such as the last X cacheable lock instructions. In this example, frequent failure of speculative locking and contention by other threads for memory which is locked (speculatively or non-speculatively) are considered a predictor of future failure of the speculative locking.

Figure 8:
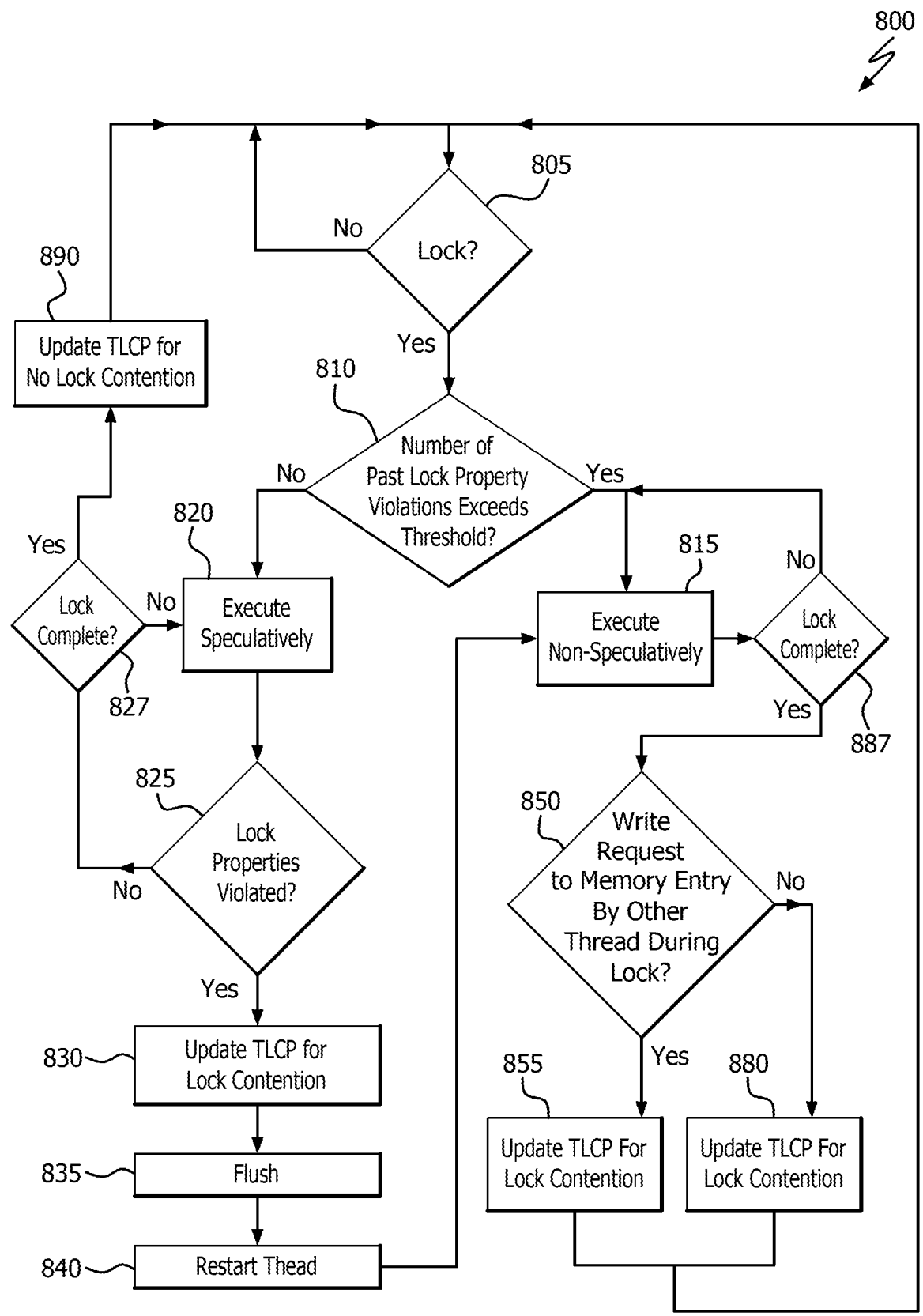
FIG. 8 is a flow chart illustrating an example method for executing speculative locks using temporal lock contention prediction.

FIG. 8 is a flow chart illustrating an example method 800 for executing speculative locks using temporal lock contention prediction (TLCP). On a condition 805 that a first thread executes a lock instruction, TLCP circuitry tests whether the lock properties have been violated (e.g., a thread other than the thread holding the lock has contended for write access to the processor cache at the locked address, or that the lock's fencing properties have been violated) following a speculative lock Y or more times in the past X cacheable lock instructions. In this example, the TLCP circuitry includes a counter for tracking the number of lock property violations that have occurred in the past X cacheable lock instructions, however the TLCP circuitry is not limited to this implementation.

On a condition 810 that the lock properties of a speculative lock on memory (any memory entry in this example) have been violated Y or more times in the past X cacheable lock instructions, the lock executes non-speculatively in step 815. While the lock executes non-speculatively in step 815, it is determined whether a write request was made by another thread to write to the non-speculatively locked memory entry. In either case, the lock continues to execute non-speculatively at step 815 unless on a condition 887 the lock is complete.

On a condition 850 that such a request was made at any point during the lock, the TLCP is updated to indicate lock contention in step 855. On a condition 850 that such a request was not made, the TLCP is updated to indicate no lock contention in step 880. It is noted that an express update may not be needed where the TLCP already reflects the appropriate state. It is also noted that the TLCP update may occur upon or after lock completion in some implementations.

If the lock properties have not been violated Y or more times in the past X cacheable lock instructions, the lock executes speculatively in step 820. After the speculative execution, the TLCP circuitry tests whether the lock properties of the speculative lock were violated. In some implementations, the data is presumed to be invalid if another thread has accessed the memory location during speculative execution.

On a condition 825 that the lock properties of the speculative lock have not been violated by lock contention from another thread, and on a condition 827 that the lock is complete, the TLCP is updated for no lock contention in step 890. On a condition 825 that the lock properties of the speculative lock have been violated by lock contention from another thread, the TLCP is updated to indicate that lock contention has occurred in step 830, the execution pipeline is flushed in step 835, the thread is restarted in step 840 and executes non-speculatively in step 815.

In some implementations these concepts may be combined. For example, lock instructions to a certain memory location may be prevented from running speculatively if a certain number of lock instructions to that memory location have resulted in flush/restarts, a certain number of lock instructions to that memory location within a certain time period have resulted in flush/restarts, lock instructions to that memory location have resulted in flush/restarts at a certain rate, or otherwise based on time.

A method for locking an entry in a memory device is disclosed herein. A lock instruction executed by a thread for a particular memory entry of a memory device is detected. Whether contention occurred for the particular memory entry during an earlier speculative lock is detected if the lock instruction is detected. The lock instruction is executed non-speculatively if contention occurred for the particular memory entry during an earlier speculative lock. The lock instruction is executed speculatively if contention did not occur for the particular memory entry during an earlier speculative lock.

In some examples, whether contention occurs for the particular memory entry from another thread during the speculative lock is detected on the condition that the lock instruction is executed speculatively. In some examples, an execution pipeline in which the thread is executing is flushed, and the thread is re-executed non-speculatively starting from the lock instruction if contention occurs for the particular memory entry from another thread during the speculative lock.

In some examples, detecting whether contention occurs for the particular memory entry from another thread during the speculative lock includes detecting whether the particular memory entry contains invalid data. In some examples, contention includes any one of: access to, modification of, a request to access, or a request to modify a memory entry by another thread during a lock of the memory entry. In some examples, detecting whether contention occurred for the particular memory entry during an earlier speculative lock includes detecting whether another thread requested access, accessed, requested to modify, or modified the particular memory entry during the earlier speculative lock. In some examples, executing the lock speculatively includes relaxing a constraint of the lock. In some examples, executing the lock speculatively includes relaxing an atomic access property or a fencing property of the lock.

A method for locking an entry in a memory device is disclosed herein. A lock instruction executed by a thread for a particular memory entry of a memory device is detected. Whether, during a particular time period, a number of earlier speculative locks of the memory for which contention occurred exceeds a threshold number is detected if the lock instruction is detected. The lock instruction is executed non-speculatively if the number exceeds the threshold number. The lock instruction is executed speculatively if the number does not exceed the threshold number.

In some examples, detecting whether, during the particular time period, the number of earlier speculative locks of the memory for which contention occurred exceeds the threshold number includes detecting whether, during the particular time period, a number of earlier speculative locks of the particular memory entry for which contention occurred exceeds the threshold number. In some examples, detecting whether, during the particular time period, the number of earlier speculative locks of the memory for which contention occurred exceeds the threshold number includes detecting whether, during the particular time period, a number of earlier speculative locks of any memory entry in the memory device for which contention occurred exceeds the threshold number.

In some examples, whether contention occurs for the particular memory entry from another thread during the speculative lock is detected on the condition that the lock instruction is executed speculatively. In some examples, an execution pipeline in which the thread is executing is flushed, and the thread is re-executed non-speculatively starting from the lock instruction if contention occurs for the particular memory entry from another thread during the speculative lock.

In some examples, detecting whether contention occurs for the particular memory entry from another thread during the speculative lock includes detecting whether the particular memory entry contains invalid data. In some examples, contention includes any one of: access to, modification of, a request to access, or a request to modify a memory entry by a thread during a lock of the memory entry. In some examples, detecting whether, during a particular time period, a number of earlier speculative locks of the memory for which contention occurred exceeds a threshold number includes detecting whether another thread requested access, accessed, requested to modify, or modified the memory during the earlier speculative lock. In some examples, executing the lock speculatively includes relaxing a constraint of the lock. In some examples, executing the lock speculatively includes relaxing an atomic access property or a fencing property of the lock.

A processing device configured for speculative locking is disclosed herein. A processor core includes an execution pipeline. Lock instruction detection circuitry is configured to detect a lock instruction executed by a thread for a particular memory entry of a memory device. Contention detection circuitry is configured to detect, if the lock instruction is detected, whether contention occurred for the particular memory entry during an earlier speculative lock. Locking circuitry is configured to execute the lock instruction non-speculatively if contention occurred for the particular memory entry during an earlier speculative lock. The locking circuitry is further configured to execute the lock instruction speculatively if contention did not occur for the particular memory entry during an earlier speculative lock.

In some examples, the contention detecting circuitry is further configured to detect whether contention occurs for the particular memory entry from another thread during the speculative lock on the condition that the lock instruction is executed speculatively. Some examples include re-execution circuitry configured to flush an execution pipeline in which the thread is executing, and re-execute the thread non-speculatively starting from the lock instruction if contention occurs for the particular memory entry from another thread during the speculative lock.

In some examples, detecting whether contention occurs for the particular memory entry from another thread during the speculative lock includes detecting whether the particular memory entry contains invalid data. In some examples, contention includes any one of: access to, modification of, a request to access, or a request to modify a memory entry by another thread during a lock of the memory entry. In some examples, detecting whether contention occurred for the particular memory entry during an earlier speculative lock includes detecting whether another thread requested access, accessed, requested to modify, or modified the particular memory entry during the earlier speculative lock. In some examples, executing the lock speculatively includes relaxing a constraint of the lock. In some examples, executing the lock speculatively includes relaxing an atomic access property or a fencing property of the lock.

A processing device configured for speculative locking is disclosed herein. A processor core includes an execution pipeline. Lock instruction detection circuitry is configured to detect a lock instruction executed by a thread for a particular memory entry of a memory device. Contention detection circuitry is configured to detect, if the lock instruction is detected, whether, during a particular time period, a number of earlier speculative locks of the memory for which contention occurred exceeds a threshold number. Locking circuitry is configured to execute the lock non-speculatively if the number exceeds the threshold number. The locking circuitry is further configured to execute the lock speculatively if the number does not exceed the threshold number.

In some examples, detecting whether, during the particular time period, the number of earlier speculative locks of the memory for which contention occurred exceeds the threshold number includes detecting whether, during the particular time period, a number of earlier speculative locks of the particular memory entry for which contention occurred exceeds the threshold number. In some examples, detecting whether, during the particular time period, the number of earlier speculative locks of the memory for which contention occurred exceeds the threshold number includes detecting whether, during the particular time period, a number of earlier speculative locks of any memory entry in the memory device for which contention occurred exceeds the threshold number. In some examples, the contention detection circuitry is further configured to detect whether contention occurs for the particular memory entry from another thread during the speculative lock on the condition that the lock instruction is executed speculatively.

Some examples include re-execution circuitry configured to flush an execution pipeline in which the thread is executing, and re-execute the thread non-speculatively starting from the lock instruction if contention occurs for the particular memory entry from another thread during the speculative lock. In some examples, detecting whether contention occurs for the particular memory entry from another thread during the speculative lock include detecting whether the particular memory entry contains invalid data. In some examples, contention includes access to, modification of, a request to access, or a request to modify a memory entry by a thread during a lock of the memory entry.

In some examples, detecting whether, during a particular time period, a number of earlier speculative locks of the memory for which contention occurred exceeds a threshold number includes any one of: detecting whether another thread requested access, accessed, requested to modify, or modified the memory during the earlier speculative lock. In some examples, executing the lock speculatively includes relaxing a constraint of the lock. In some examples, executing the lock speculatively includes relaxing an atomic access property or a fencing property of the lock.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for locking an entry in a memory device, comprising:
   executing a lock instruction of a thread to lock a particular memory entry of the memory device,
   wherein the lock instruction is executed either speculatively or non-speculatively based on whether the particular memory entry was modified by a second thread during a window of exposure of an earlier speculative lock;
   wherein executing the lock instruction non-speculatively includes disallowing modification by the second thread to the particular memory entry;
   wherein executing the lock instruction speculatively includes permitting modification by the second thread to the particular memory entry; and
   wherein the window of exposure is a time interval from a time when the particular memory entry was read during the earlier speculative lock to a time when the earlier speculative lock completed.

2. The method of claim 1, further comprising:
   responsive to the lock instruction being executed as a speculative lock, detecting whether another thread writes to the particular memory entry during the speculative lock.

3. The method of claim 2, further comprising:
   responsive to another thread writing to the particular memory entry during the speculative lock, flushing an execution pipeline in which the thread is executing, and re-executing the thread starting from the lock instruction, wherein the lock instruction is re-executed non-speculatively.

4. The method of claim 2, wherein detecting whether another thread writes to the particular memory entry during the speculative lock comprises detecting whether the particular memory entry contains invalid data.

5. The method of claim 1, wherein detecting whether another thread writes to the particular memory entry comprises detecting any one of: access to, modification of, a request to access, or a request to modify a memory entry by another thread during a lock of the memory entry.

6. The method of claim 1, wherein detecting whether another thread writes to the particular memory entry during an earlier speculative lock comprises detecting whether another thread requested access, accessed, requested to modify, or modified the particular memory entry during the earlier speculative lock.

7. The method of claim 1, wherein executing the lock instruction speculatively comprises relaxing a constraint of the lock.

8. The method of claim 1, wherein executing the lock instruction speculatively comprises relaxing an atomic access property or a fencing property of the lock.

9. A method for locking an entry in a memory device, comprising:
   executing a lock instruction of a thread to lock a particular memory entry of a memory device,
   wherein the lock instruction is executed either speculatively or non-speculatively based on whether, during a particular time period, a number of times the particular memory entry was modified to by a second thread during a window of exposure of an earlier speculative lock exceeds a threshold number;
   wherein executing the lock instruction non-speculatively includes disallowing modification by the second thread to the particular memory entry;

wherein executing the lock instruction speculatively includes permitting modification by the second thread to the particular memory entry; and wherein the window of exposure is a time interval from a time when the particular memory entry was read during one of the earlier speculative locks to a time when the one of the earlier speculative lock completed.

10. The method of claim 9, wherein the lock instruction is executed either speculatively or non-speculatively based on whether, during the particular time period, a number of times any memory entry in the memory device was written to by another thread during a window of exposure of an earlier speculative lock exceeds a threshold number.

11. The method of claim 9, further comprising, responsive to the lock instruction being executed speculatively, detecting whether another thread writes to the particular memory entry during the speculative lock.

12. The method of claim 11, further comprising, responsive to another thread writing to the particular memory entry during the speculative lock, flushing an execution pipeline in which the thread is executing, and re-executing the thread starting from the lock instruction.

13. The method of claim 11, wherein detecting whether another thread writes to the particular memory during the speculative lock comprises detecting whether the particular memory entry contains invalid data.

14. The method of claim 9, wherein detecting whether another thread wrote to the particular memory entry comprises detecting any one of: access to, modification of, a request to access, or a request to modify a memory entry by a thread during a lock of the memory entry.

15. The method of claim 9, wherein detecting whether, during a particular time period, a number of earlier speculative locks during which another thread wrote to the particular memory entry exceeds a threshold number comprises detecting whether another thread requested access, accessed, requested to modify, or modified the particular memory entry during the earlier speculative lock.

16. The method of claim 9, wherein executing the lock speculatively comprises relaxing a constraint of the lock.

17. The method of claim 9, wherein executing the lock speculatively comprises relaxing an atomic access property or a fencing property of the lock.

18. A processing device configured for speculative locking, the device comprising:
    a processor core including an execution pipeline;
    wherein the processing device is configured to:
        execute a lock instruction of a thread to lock a particular memory entry of a memory device,
    wherein the lock instruction is executed either speculatively or non-speculatively based on whether the particular memory entry was modified by a second thread during a window of exposure of an earlier speculative lock;
    wherein executing the lock instruction speculatively includes permitting modification by the second thread to the particular memory entry; and
    wherein the window of exposure is a time interval from a time when the particular memory entry was read during the earlier speculative lock to a time when the earlier speculative lock completed.

19. The processing device of claim 18, further configured to detect whether another thread writes to the particular memory during the speculative lock responsive to the lock instruction being executed as a speculative lock.

20. The processing device of claim 19, further configured to flush an execution pipeline in which the thread is executing, and re-execute the thread starting from the lock instruction responsive to another thread writing to the particular memory entry during the speculative lock.

21. The processing device of claim 19, wherein detecting whether another thread writes to the particular memory entry during the speculative lock comprises detecting whether the particular memory entry contains invalid data.

22. The processing device of claim 18, wherein detecting whether another thread writes to the particular memory entry comprises detecting any one of: access to, modification of, a request to access, or a request to modify a memory entry by another thread during a lock of the memory entry.

23. The processing device of claim 18, wherein detecting whether another thread writes to the particular memory entry during an earlier speculative lock comprises detecting whether another thread requested access, accessed, requested to modify, or modified the particular memory entry during the earlier speculative lock.

24. The processing device of claim 18, wherein executing the lock instruction speculatively comprises relaxing a constraint of the lock.

25. The processing device of claim 18, wherein executing the lock instruction speculatively comprises relaxing an atomic access property or a fencing property of the lock.

26. A processing device configured for speculative locking, the device comprising
    a processor core including an execution pipeline;
    wherein the processing device is configured to:
        execute a lock instruction of a thread to lock a particular memory entry of a memory device,
    wherein the lock instruction is executed either speculatively or non-speculatively based on whether, during a particular time period, a number of times the particular memory entry was modified by a second thread during a window of exposure of an earlier speculative lock exceeds a threshold number;
    wherein executing the lock instruction as a speculative lock includes permitting modification by the second thread to the particular memory entry;
    wherein the window of exposure is a time interval from a time when the particular memory entry was read during one of the earlier speculative locks to a time when the one of the earlier speculative lock completed.

27. The processing device of claim 26, the lock instruction is executed either speculatively or non-speculatively based on whether, during the particular time period, a number of times any memory entry in the memory device was modified by another thread during a window of exposure of an earlier speculative lock exceeds a threshold number.

28. The processing device of claim 26, wherein the processing device is further configured to detect whether another thread writes to the particular memory entry during the speculative lock responsive to the lock instruction being executed speculatively.

29. The processing device of claim 26, further comprising re-execution circuitry configured to flush an execution pipeline in which the thread is executing, and re-execute the thread starting from the lock instruction responsive to another thread writing to the particular memory entry during the speculative lock.

30. The processing device of claim 26, wherein detecting whether another thread writes to the particular memory entry during the speculative lock comprises detecting whether the particular memory entry contains invalid data.

31. The processing device of claim 26, wherein detecting whether another thread wrote to the particular memory entry comprises detecting any one of: access to, modification of, a request to access, or a request to modify a memory entry by a thread during a lock of the memory entry.

32. The processing device of claim 26, wherein detecting whether, during a particular time period, a number of earlier speculative locks during which another thread wrote to the particular memory entry exceeds a threshold number comprises detecting whether another thread requested access, accessed, requested to modify, or modified the particular memory entry during the earlier speculative lock.

33. The processing device of claim 26, wherein executing the lock speculatively comprises relaxing a constraint of the lock.

34. The processing device of claim 26, wherein executing the lock speculatively comprises relaxing an atomic access property or a fencing property of the lock.

* * * * *